July 8, 1952  R. PASSET  2,602,372

REMOVABLE SCREEN FOR SPECTACLES

Filed April 14, 1950 2 SHEETS—SHEET 1

INVENTOR
ROBERT PASSET

By:
AGENTS

July 8, 1952  R. PASSET  2,602,372
REMOVABLE SCREEN FOR SPECTACLES
Filed April 14, 1950  2 SHEETS—SHEET 2

INVENTOR
ROBERT PASSET
By:
Hazeltine, Lake & G.
AGENTS

Patented July 8, 1952

2,602,372

UNITED STATES PATENT OFFICE 2,602,372

REMOVABLE SCREEN FOR SPECTACLES

Robert Passet, Vincennes, France, assignor to Georges Lissac, Paris, France, a corporation of France Application April 14, 1950, Serial No. 155,822
In France February 18, 1950

2 Claims. (Cl. 88—41)

This invention relates to removable screens of the type adapted to be fitted over ophthalmic glasses or spectacles for such purposes as to introduce an additional correction to the latter or to insert additional glasses or lenses to serve as shields protecting the eyes from light or ultraviolet rays.

It is an object of the invention to provide an improved spectacle-screen device of the type described which is simple in construction and can be easily and quickly fitted to, and removed from, any type of existing spectacles.

An essential feature of the improved spectacle-screen lies in the fact that its curvature in a horizontal plane is greater (or its radius of curvature smaller) than that of the spectacles in connection with which it is to be used so that, when placed over said spectacles, it will contact the latter substantially only at points adjacent the outer ends of the lenses or frame, near the sides of the frame of the spectacles. The spectacle-screen is provided with engaging means such as a pair of resilient hooks or the like adjacent to the nose-rest of the screen adapted to engage over the frame of the spectacles and to bear with their ends against the lenses of the spectacles. Conveniently, said engaging means are in the form of thin flexible metal rods provided with round end-knobs.

A spectacle-screen according to the invention may be provided with glasses or lenses of any desired shape and size, which may be entirely different from those of the spectacles to which it is to be fitted. It may be used in conjunction with any type of spectacle-frame.

The object, feature and advantages of the invention will appear from the ensuing description of a few exemplary embodiments thereof, given by way of indication and not of limitation, and illustrated in the accompanying drawings, wherein.

Figure 1:
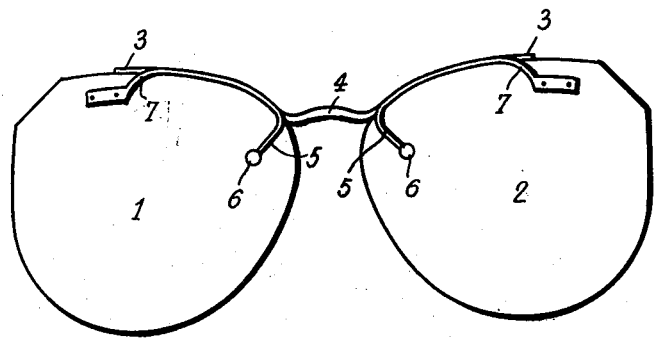
Fig. 1 is a front view in elevation of one form of a spectacle-screen according to the invention.
Figure 2:
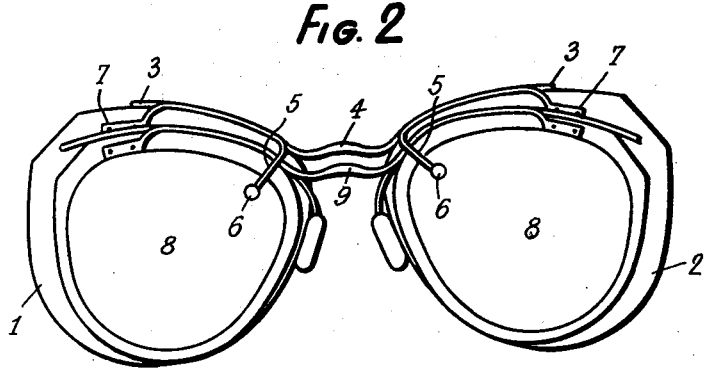
Fig. 2 shows the screen of Fig. 1, as mounted on a pair of glasses, looking from the glasses side.

As shown in the drawings, a spectacle-screen according to the invention may comprise a pair of glasses or lenses 1, 2, with or without rims, and a frame or mounting 3 interconnecting the lenses and providing an elevated nose-rest or bridge 4. From the mounting 3 adjacent to the opposite ends of the bridge portion 4 thereof, project two thin metallic rods 5 bent to provide hooks and preferably terminating each in a round or oblong knob 6.

As shown by way of example in Fig. 1, the mounting 3 may have soldered or welded to it supports 7 for the lenses 1, 2 or rims and each of the above-mentioned hooks 5 may be merely constituted by an extension of the related support 7. It will be understood however that the supports 7 for the lenses 1, 2 or rims could be formed as separate parts and suitably secured to the mounting 3 at the positions shown as by screws, rivets or otherwise.

Figure 4:
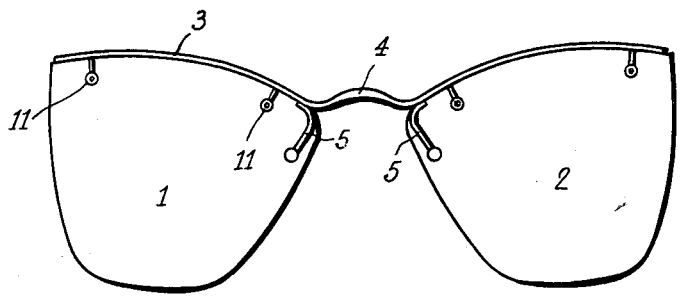
Figs. 4, 5 and 6 relate to modified constructions.
Figure 5:
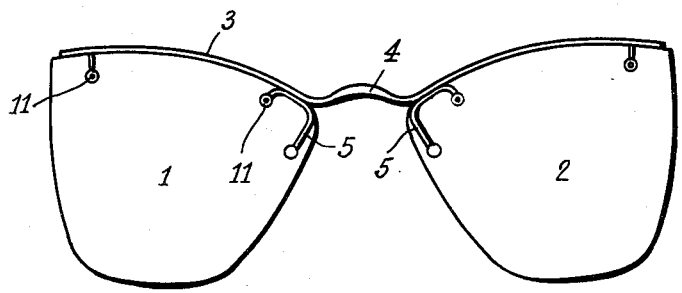

As shown in Figs. 4 and 5, each lens 8 or rim may alternatively be secured to the mounting 3 at two spaced points as at 11, 11.

Figure 3:
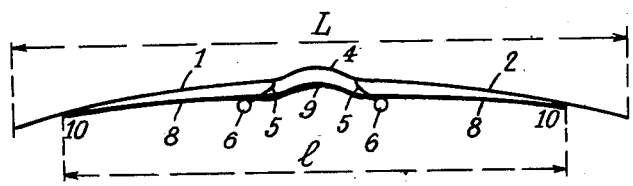
Fig. 3 is a diagrammatic view in horizontal cross-section of a similar assembly, illustrating the relative curvatures thereof according to a feature of the invention; in this view, the curvatures have been exaggerated for explanatory purposes.

The spectacle-screen constructed as just described is adapted to be removably fitted to a pair of spectacles or glasses comprising a pair of focalized lenses 8 for example, for any of the previously-mentioned purposes. To this end and as shown in the diagram of Fig. 3, the width L of the screen may be made larger than the width l of the largest size of glasses in connection with which the device may have to be used. Thus the glasses will, with the exception of its nose-bridge 9, be in this case completely masked by the glasses 1, 2 of the screen; this condition however is in no way essential and the width of the screen may if desired be provided smaller than that of the spectacles.

What is essential however according to the invention is that the curvature of the screen in a horizontal plane is higher (or its radius smaller) than the curvature of the spectacles in the same horizontal plane. This condition is clearly depicted in Fig. 3, from which it will be seen the cross-sections of the screen and the spectacles intersect one another, or in other words that the ends 10 of the glasses bear against the lenses 1', 2 of the screen, the spectacles thus bridging the screen.

The hook portion 5 mentioned above, when engaged over the tops of the glasses, will thus firmly retain the screen in its properly assembled position. The engaging members of hook 5 formed by thin flexible metal rods may be easily conformed to suit any particular shape and size of spectacles so that a perfect fit may be achieved in each case.

It will furthermore be noted that the mounting 3 of the screen is preferably readily deformable to enable its radius of curvature to be altered or its lenses 1, 2 and hooks 5 to be displaced relatively to the bridge 4.

Figure 6:
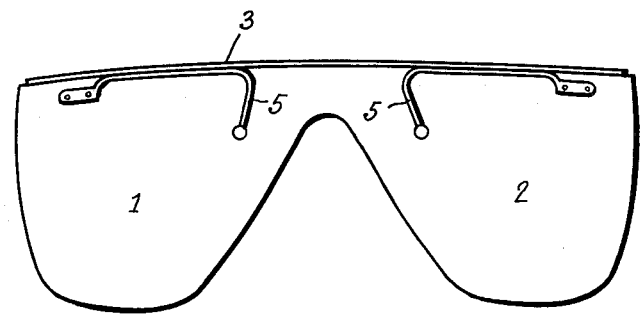

While the transparent elements 1, 2 of the screen have been described as lenses or glasses, it is obvious that these are not necessarily glass elements, but may be made of suitable transparent plastics, and that they may receive any desired suitable shape. In particular, rather than being provided separate from each other, as in the embodiment described above, they may be integral with each other and be in the form of an eye-shade as in Fig. 6.

In the modification shown in Fig. 4, already mentioned above, the mounting 3 of the screen is provided with projecting lugs 11 whereby each lens of the screen may be secured at two spaced points thereof. The hooks 5 are secured to the mounting 3 adjacent the ends of the nosebridge 4.

In the further modification of Fig. 5, each engaging member or hook 5 is formed integral with an inner securing lug 11 for the related glass, while the outer securing lug remains directly attached to the mounting. A variety of other modifications and minor changes in the structural details of the improved screen may readily be devised within the scope of this invention.

I claim:

1. A removable screening device for disposal in front of spectacles; said device comprising transparent screen lenses, a frame bar secured to the top portions of said screen lenses, said bar being resilient in the horizontal direction and bent sufficiently in said direction so that, when the device is placed against the front of the spectacles with said frame bar non-flexed, the spectacles contact said lenses adjacent the outer edge portions thereof and are spaced rearwardly from said lenses at the inside edge portions thereof adjacent the central portion of said frame bar, and support members projecting from said central portion of the frame bar and formed with downwardly extending portions spaced rearwardly from said central portion of the frame bar to extend over and behind the spectacles, said downwardly extending portions being spaced rearwardly from said central portion of the frame bar distances less than the distance between said central portion and the rear surfaces of the spectacles at the center of the latter when said device is placed against the spectacles with said bar non-flexed so that said downwardly extending portions of the support members, when disposed behind the spectacles, are effective to displace said central portion of the resilient frame bar toward the spectacles thereby urging the spectacles into firm engagement with said screen lenses at the outer edge portions of the latter for providing a secure attachment of said device to the spectacles.

2. A removable screen device for disposal in front of spectacles; said device comprising a pair of transparent screen lenses, a frame for said lenses including a frame bar secured to the top portions of said lenses and extending between the latter, said frame bar being resilient in the horizontal direction and curved in said direction to dispose the outer edge portions of said lenses sufficiently to the rear of the central portion of said frame bar so that, when said device is placed against the front of the spectacles with said frame bar non-flexed, the spectacles engage said lenses adjacent the outer edge portions of the latter and are spaced rearwardly from the inside edge portions of said lenses adjacent said central portion of the frame bar, and support members projecting from said central portion of the frame bar and formed with downwardly extending portions spaced rearwardly from said central portion to extend over and behind the upper portion of the spectacles, said downwardly extending portions being spaced rearwardly from said central portion of the frame bar distances less than the distance between said central portion and the rear surfaces of the spectacles adjacent to said central portion when said device is placed against the spectacles with said frame bar non-flexed so that said downwardly extending portions in engaging the rear surfaces of the spectacles are effective to decrease the curvature of said resilient frame bar thereby urging the spectacles against said screen lenses adjacent the outer edge portions of the latter to hold said device on the spectacles.

ROBERT PASSET.

REFERENCES CITED

The following references are of record in the file of this patent:

UNITED STATES PATENTS

| Number | Name | Date |
|---|---|---|
| 656,269 | Sanger | Aug. 21, 1900 |
| 756,984 | Searl | Apr. 12, 1904 |
| 1,709,195 | Shindel | Apr. 16, 1929 |
| 2,159,710 | Reichert | May 23, 1939 |
| 2,230,577 | Sager | Feb. 4, 1941 |

FOREIGN PATENTS

| Number | Country | Date |
|---|---|---|
| 61,369 | Norway | Sept. 4, 1939 |